(12) United States Patent
Keesara et al.

(10) Patent No.: US 10,805,390 B2
(45) Date of Patent: *Oct. 13, 2020

(54) AUTOMATED MIRRORING AND REMOTE SWITCH PORT ANALYZER (RSPAN) FUNCTIONS USING FABRIC ATTACH (FA) SIGNALING

(71) Applicant: Extreme Networks, Inc., San Jose, CA (US)

(72) Inventors: Srikanth Keesara, Tewksbury, MA (US); Venkat Dabbara, Santa Clara, CA (US); Parthiv Shrimankar, Bangalore (IN); Robert Lee, Lexington, MA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,438

(22) Filed: Oct. 8, 2018

(65) Prior Publication Data

US 2019/0109902 A1 Apr. 11, 2019

Related U.S. Application Data

(63) Continuation of application No. 15/010,249, filed on Jan. 29, 2016, now Pat. No. 10,097,633.

(51) Int. Cl.
| | |
|---|---|
| *H04L 29/08* | (2006.01) |
| *H04L 12/26* | (2006.01) |
| *H04L 12/46* | (2006.01) |

(52) U.S. Cl.
CPC .......... *H04L 67/1095* (2013.01); *H04L 12/46* (2013.01); *H04L 12/462* (2013.01);
(Continued)

(58) Field of Classification Search
CPC .......... H04L 67/1095; H04L 43/062
See application file for complete search history.

(56) References Cited

U.S. PATENT DOCUMENTS

| | | |
|---|---|---|
| 7,899,048 B1 | 3/2011 | Walker et al. |
| 8,520,540 B1 | 8/2013 | Foschiano et al. |
| (Continued) | | |

FOREIGN PATENT DOCUMENTS

| | | |
|---|---|---|
| EP | 2398188 A1 | 12/2011 |
| EP | 2924951 A1 | 9/2015 |
| GB | 2505747 A | 3/2014 |

OTHER PUBLICATIONS

Ashkan Aghdai et al; Traffic Measurement and Analysis in an Organic Enterprise Data Center; 2013 IEEE 14th International Conference on High Performance Switching and Routing; Jul. 8, 2013; pp. 49-55; IEEE.

(Continued)

*Primary Examiner* — Adnan M Mirza
(74) *Attorney, Agent, or Firm* — Sterne, Kessler, Goldstein & Fox P.L.L.C.

(57) ABSTRACT

A method and apparatus for automated mirroring is presented. A network device running as a Fabric Attach (FA) server configured to mirror traffic to a Remote Switch Port Analyzer (RSPAN) Virtual Local Area Network (VLAN), issues an FA Type Length Value (TLV) on its uplink to the FA server. The TLV includes a request to associate said RSPAN VLAN with a Service Identifier (I-SID) used to carry mirror traffic in a network. The network device sends the mirrored traffic on the RSPAN VLAN on its uplink to the FA server. The network device signals the I-SID into the network, and detects receive interest in the I-SID. The network device delivers the mirrored traffic to devices that expressed a receive interest in the mirrored traffic.

20 Claims, 3 Drawing Sheets

(52) U.S. Cl.
CPC ........ *H04L 12/4641* (2013.01); *H04L 43/062* (2013.01); *H04L 43/12* (2013.01); *H04L 43/14* (2013.01)

(56) References Cited

U.S. PATENT DOCUMENTS

| | | |
|---|---|---|
| 9,088,506 B2 | 7/2015 | Keesara et al. |
| 9,094,318 B2 | 7/2015 | Ramesh |
| 9,497,039 B2 | 11/2016 | Greenberg et al. |
| 10,075,522 B2 | 9/2018 | Keesara et al. |
| 10,097,633 B2 | 10/2018 | Keesara et al. |
| 2012/0324442 A1 | 12/2012 | Barde |
| 2013/0259046 A1 | 10/2013 | Ramesh |
| 2014/0016482 A1 | 1/2014 | de Silva |
| 2014/0075041 A1 | 3/2014 | Keesara et al. |
| 2017/0223103 A1 | 8/2017 | Keesara et al. |
| 2017/0223104 A1 | 8/2017 | Keesara et al. |

OTHER PUBLICATIONS

György Koch; Extended European Search Report; European Patent Application No. 17153580.0; dated Mar. 24, 2017; European Patent Office; Munich, Germany.
A. Doria; Etri; Network Working Group Memo, "ForCES Protocol Specification; draft-ietf-forces-protocoi-OO.txt"; The Internet Society; Sep. 25, 2004; Geneva, Switzerland.
Andreas Bertsch; Extended European Search Report; European Application No. 17153578.4; dated May 29, 2017; European Patent Office; Munich, Germany.

AUTOMATED MIRRORING AND REMOTE SWITCH PORT ANALYZER (RSPAN) FUNCTIONS USING FABRIC ATTACH (FA) SIGNALING

CROSS REFERENCE TO RELATED APPLICATIONS

This application is a continuation of U.S. patent application Ser. No. 15/010,249, filed Jan. 29, 2016, now allowed, and is related to U.S. patent application Ser. No. 15/010,009, filed Jan. 29, 2016, now U.S. Pat. No. 10,075,522, and which is incorporated herein by reference in its entirety.

BACKGROUND

Data stream mirroring provides a duplication of a stream of data packets to an alternate destination in addition to a primary destination. Mirroring may be employed for debugging and diagnoses of network traffic anomalies, security and surveillance, and as a failover or redundancy path for critical data. Mirroring involves identification of a source stream, typically designated as a router port and optionally with filtering to restrict particular source or destination addresses, for example. The mirroring setup also designates a mirroring destination as the recipient of the mirrored stream, resulting in a duplicate packet for each packet in the identified source stream.

Remote Switch Port Analyzer (RSPAN) and Encapsulated Remote Switch Port Analyzer (ERSPAN) are efficient, high performance traffic monitoring systems. They duplicate network traffic to one or more monitor interfaces as it transverse a switch. While the term RSPAN is used throughout the application, it should be appreciated that ERSPAN could also be used and the terms are used interchangeably throughout. RSPAN is used for troubleshooting connectivity issues and calculating network utilization and performance, among many others. RSPAN allows a user to monitor traffic from source ports distributed over multiple switches. RSPAN works by mirroring the traffic from the source ports of an RSPAN session onto a Virtual Local Area Network (VLAN) that is dedicated for the RSPAN session. This VLAN is then trunked to other switches, allowing the RSPAN session traffic to be transported across multiple switches. On the switch that contains the destination port for the session, traffic from the RSPAN session VLAN is simply mirrored out the destination port. ERSPAN brings Generic Routing Encapsulation (GRE) for all captured traffic and allows it to be extended across Layer 3 domains.

Fabric Attach (FA) is an enhanced implementation of Shortest Path Bridging (SPB)) technology that simplified operations through access layer only network provisioning. FA delivers a "Zero-Touch-Core" that virtually eliminates the chance of core network misconfiguration. It allows simple and secure deployment for any type of network service without the need to make any configuration changes on intermediate/core nodes, even in environments where clients roam. These same benefits are also available to network elements or hosts that are not SPB-capable. Any FA capable device (a switch, server, Access Point (AP), Internet Protocol (IP) Phone, etc.) can be securely connected to the network, be authorized for a network service, and attach to the appropriate network service instance—all automatically and based on policy. This enables Fabric Attach devices to come straight out of the box and onto the network with "Zero Touch".

SUMMARY

Mirroring is a commonly supported mechanism in networking equipment. Mirroring means sending a copy of a traffic stream to one or more additional mirror destinations in addition to the normal packet processing actions that are performed on that traffic stream. It is used for supporting applications like traffic monitoring and analysis. It is also sometimes use for troubleshooting problems in a network.

Configurations herein are based, in part, on the observation that mechanisms for managing the configuration of remote mirroring are cumbersome and most often require the configuration of multiple network elements (switches, routers, etc.) for each stream of traffic that needs to be mirrored. Unfortunately, conventional arrangements suffer from the shortcoming that multiple configuration actions need occur at multiple locations depending on the location of the routing entities (routers/switches, etc.) designated as the source of the mirrored stream and the destination recipients of the mirrored stream. Disabling mirroring likewise requires a reversal of these actions or unnecessary bandwidth remains allocated to mirroring activities. Accordingly, configurations herein substantially overcome the above described shortcomings by use of FA signaling to provide dynamic control of mirror traffic.

Generally mirroring supports one or more of the following. Local Mirroring is where a mirror destination is a local port or a group of local ports on the device. RSPAN is where a mirror destination is a Virtual Local Area Network (VLAN). Mirrored traffic then flows along the topology of the VLAN. ERSPAN is where mirrored traffic is encapsulated in an Internet Protocol (IP) Tunnel (typically GRE encapsulation) and sent to the destination IP address of the tunnel.

What is missing overall is an easy way for a network element to request that some traffic from it be mirrored or for a monitoring station/application to request that a certain mirrored traffic be delivered to it, and further should be deployed in such a fashion that the traffic gets mirrored only when a listening applications is deployed and connected to the network. Once the application goes offline, then mirroring should stop.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

In a particular embodiment of a method for automated mirroring, the method includes deploying and launching a monitoring application on a network device connected to a Fabric Attach (FA) server in a network, wherein the monitoring application is configured with the Service Identifier (I-SID) values of the mirror streams to be monitored. The method further includes issuing, by the monitoring application, an FA Type Length Value (TLV) on the link that connects to the FA Server, wherein the FA TLV includes the I-SID corresponding to the mirror stream that is being requested. The method additionally comprises receiving the mirrored stream via a Remote Switch Port Analyzer (RS-PAN) Virtual Local Area Network (VLAN) at said monitoring application.

Other embodiments include a computer readable medium having computer readable code thereon for automated mirroring. The computer readable medium includes instructions for launching a monitoring application on a network device connected to a Fabric Attach (FA) server in a network, wherein the monitoring application is configured with the Service Identifier (I-SID) values of the mirror streams to be monitored. The computer readable medium further includes instructions for issuing, by the monitoring application, an FA Type Length Value (TLV) on the link that connects to the FA Server, wherein the FA TLV includes the I-SID corresponding to the mirror stream that is being requested. The computer readable medium additionally comprises instructions for receiving the mirrored stream via a Remote Switch Port Analyzer (RSPAN) Virtual Local Area Network (VLAN) at said monitoring application.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process for automated mirroring and RSPAN/ERSPAN functions using FA signaling as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations for automated mirroring and RSPAN/ERSPAN functions using FA signaling as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

The present invention allows a mirror traffic destination point to request mirrored traffic. Each of the access device providing traffic coming from it be mirrored and the device receiving the mirrored traffic can be deployed independent of the other.

For the case of a mirror traffic destination point (e.g., a monitoring application) requesting mirror traffic, the process is as follows. A monitoring application is deployed on a device connected to an FA Server. A monitoring application is launched from a workstation or a device and is configured with the I-SID values of the mirror streams that it is supposed to monitor. The monitoring application issues an FA TLV on the link that connects to the FA Server. The TLV includes the I-SID corresponding to the traffic stream that is being requested. The VLAN ID value in the FA TLV is locally significant and can be assigned by the monitoring station. It can be used to multiplex if multiple streams are being mirrored to the same monitoring station.

Figure 1:
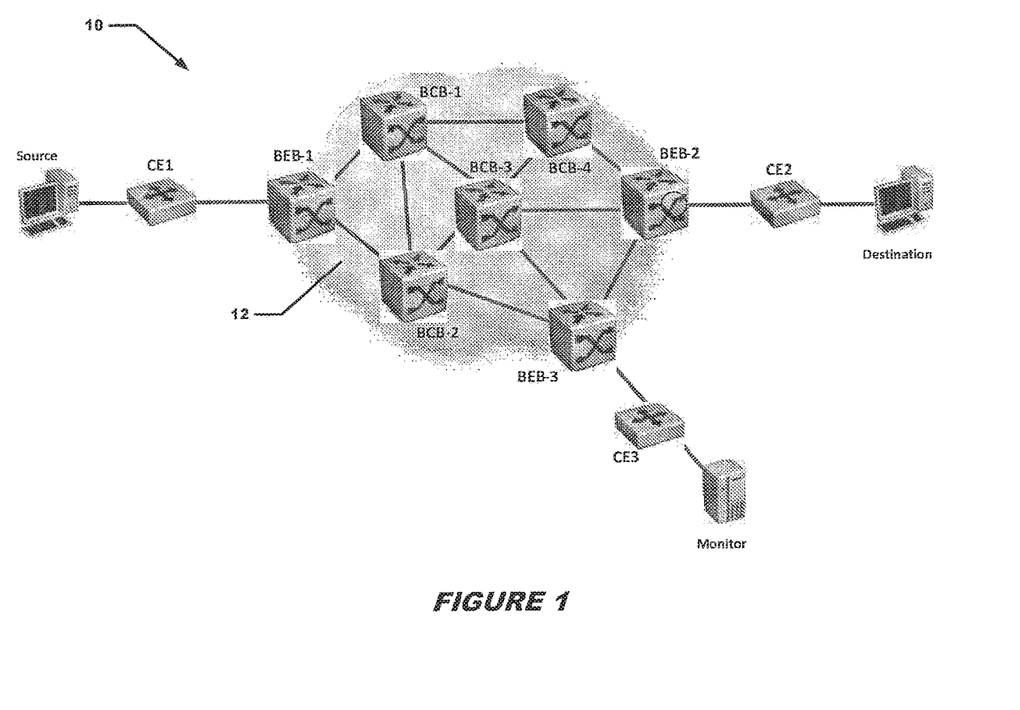
FIG. 1 depicts a block diagram of a first environment for automated mirroring and RSPAN/ERSPAN functions using FA signaling in accordance with a particular embodiment of the present invention.

Referring now to FIG. 1, a mirroring environment 10 is shown. A Shortest Path Bridging (SPB) network 12 includes a plurality of Backbone Edge Bridges (BEB-1, BEB-2, and BEB-3) and a plurality of Backbone Core Bridges (BCB-1, BCB-2, BCB-3, and BCB-4), also referred to simply as network devices. A source communicates with the SBP network 12 by way of Customer Equipment (CE1). A destination is in communication with SPB Network 12 by way of CE2. A monitor communicates with the SPB network 12 by way of CE3.

For the case of a mirror traffic destination point (e.g., a monitoring application) requesting mirror traffic, the process is as follows. A monitoring application is deployed on a device (Monitor) connected to an FA Server (BEB-3). A monitoring application is launched from a workstation or a device and is configured with the I-SID values of the mirror streams that it is supposed to monitor. The monitoring application issues an FA TLV on the link that connects to the FA Server BEB-3. The TLV includes the I-SID corresponding to the traffic stream that is being requested. The mirrored stream is received by the monitor via a Remote Switch Port Analyzer (RSPAN) Virtual Local Area Network (VLAN) at the monitoring application.

The VLAN ID value in the FA TLV is locally significant and can be assigned by the monitoring station. It can be used to multiplex if multiple streams are being mirrored to the same monitoring station. The normal data goes through BEB-1, to BCB-1, to BCB-3, to BEB-2, to CE2 and to the destination. The mirrored traffic, by way of the FA signaling, goes through BEB-1, to BCB-2, to BEB-3, to CE3 and to the monitor.

A couple of enhancements can also be made to the FA signaling to make it more applicable to a mirroring application. Mirroring typically involves traffic going from a point that is being mirrored to the destination(s) that are recipients of the mirror traffic. With the current FA TLVs—when a request is sent it is treated as a request to both transmit and receive operation. Mirroring needs to transmit or receive but not both on the same port. One enhancement is to add TX and RX bit definitions to the current FA I-SID assignment TLVs. This could be accomplished by using the reserved bits in the currently defined TLVs, or a new TLV can be used.

Figure 2:
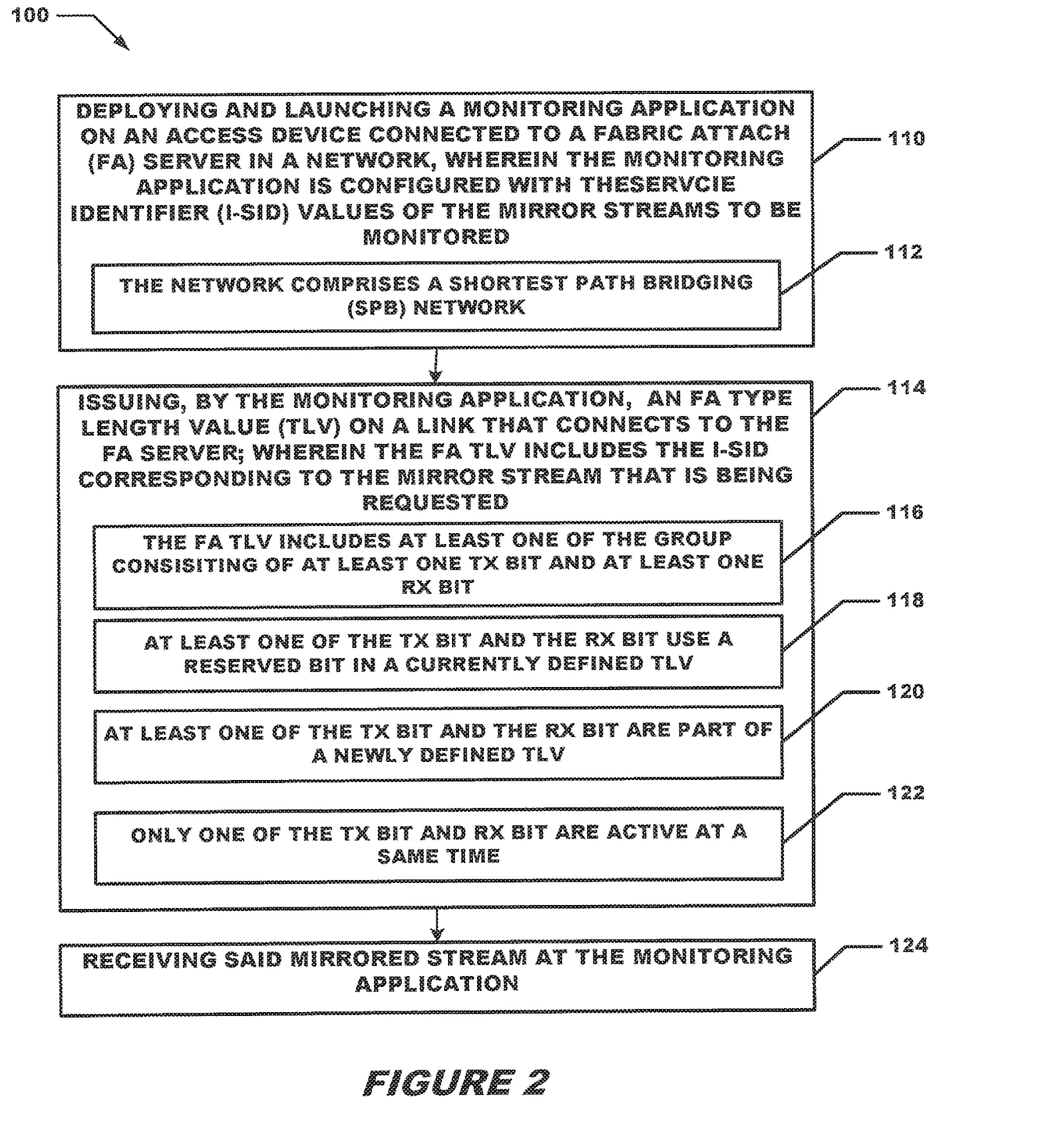
FIG. 2 depicts a flow diagram of a particular embodiment of a method for automated mirroring and RSPAN/ERSPAN functions using FA signaling in accordance with a particular embodiment of the present invention.

A flow chart of the presently disclosed method is depicted in FIG. 2. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The method 100 begins with processing block 110 which discloses deploying and launching a monitoring application on a network device connected to a Fabric Attach (FA) server in a network, wherein the monitoring application is configured with the Service Identifier (I-SID) values of the mirror streams to be monitored Processing block 112 states the network comprises a shortest Path Bridging (SPB) network.

Processing block 114 states issuing, by the monitoring application, an FA Type Length Value (TLV) on the link that connects to the FA Server, wherein said FA TLV includes the I-SID corresponding to the mirror stream that is being requested. As shown in processing block 112, the network comprises an SPB network.

Processing block 116 states wherein the FA TLV includes at least one of a transmit (TX) bit and a Receive (RX) bit. Processing block 118 recites at least one of a transmit (TX) bit and a Receive (RX) bit use at least one reserved bit in a currently defined TLV. Alternately, as shown in processing block 120 at least one of a transmit (TX) bit and a Receive (RX) bit are part of a newly defined TLV. Processing block 122 recites only one of said Transmit (TX) bit and said Receive (RX) bit are active at a same time.

Processing block 124 discloses receiving said mirrored stream via a Remote Switch Port Analyzer (RSPAN) Virtual Local Area Network (VLAN) at said monitoring application.

Figure 3:
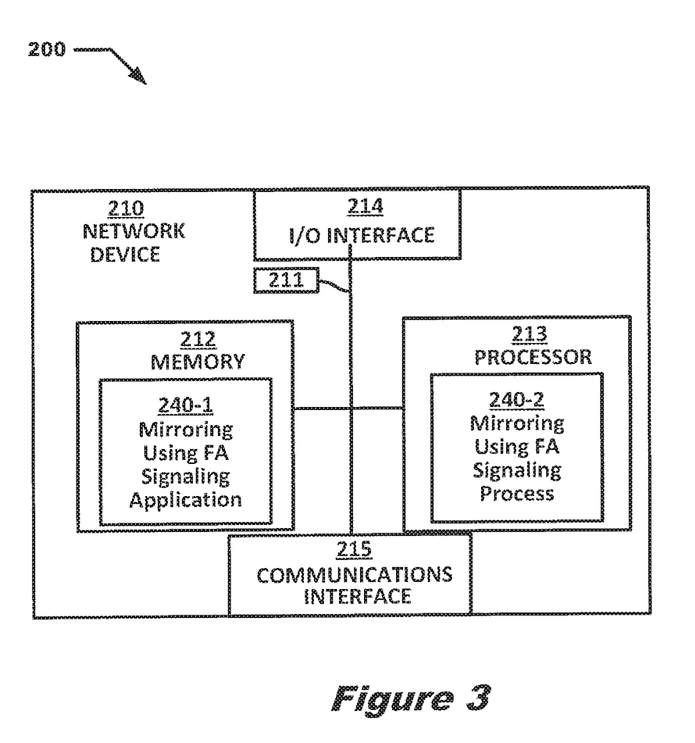
FIG. 3 depicts a block diagram of a network device performing automated mirroring and RSPAN/ERSPAN functions using FA signaling (referred to as Mirroring Using FA Signaling in the Figure) in accordance with a particular embodiment of the present invention.

FIG. 3 is a block diagram 200 illustrating example architecture of an network device 210 that executes, runs, interprets, operates or otherwise performs a process for automated mirroring and RSPAN/ERSPAN functions using FA signaling application 240-1 and automated mirroring and RSPAN/ERSPAN functions using FA signaling operating process 240-2 suitable for use in explaining example configurations disclosed herein. As shown in this example, the network device 210 includes an interconnection mechanism 211 such as a data bus or other circuitry that couples a memory system 212, a processor 213, an input/output interface 214, and a communications interface 215. The communications interface 215 enables the AA server 210 to communicate with other devices (i.e., other computers) on a network (not shown).

The memory system 212 is any type of computer readable medium, and in this example, is encoded with an automated mirroring and RSPAN/ERSPAN functions using FA signaling operating application 240-1 as explained herein. The automated mirroring and RSPAN/ERSPAN functions using FA signaling operating application 240-1 may be embodied as software code such as data and/or logic instructions (e.g., code stored in the memory or on another computer readable medium such as a removable disk) that supports processing functionality according to different embodiments described herein. During operation of the network device 310, the processor 213 accesses the memory system 212 via the interconnect 211 in order to launch, run, execute, interpret or otherwise perform the logic instructions of an automated mirroring and RSPAN/ERSPAN functions using FA signaling operating application 240-1. Execution of an automated mirroring and RSPAN/ERSPAN functions using FA signaling operating application 240-1 in this manner produces processing functionality in the automated mirroring and RSPAN/ERSPAN functions using FA signaling operating process 240-2. In other words, automated mirroring and RSPAN/ERSPAN functions using FA signaling operating process 240-2 represents one or more portions or runtime instances of an automated mirroring and RSPAN/ERSPAN functions using FA signaling operating application 240-1 (or the entire automated mirroring and RSPAN/ERSPAN functions using FA signaling operating application 240-1) performing or executing within or upon the processor 213 in the network device 210 at runtime.

It is noted that example configurations disclosed herein include the automated mirroring and RSPAN/ERSPAN functions using FA signaling operating application 240-1 itself (i.e., in the form of un-executed or non-performing logic instructions and/or data). The automated mirroring and RSPAN/ERSPAN functions using FA signaling operating application 240-1 may be stored on a computer readable medium (such as a floppy disk), hard disk, electronic, magnetic, optical, or other computer readable medium. An automated mirroring and RSPAN/ERSPAN functions using FA signaling operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of an automated mirroring and RSPAN/ERSPAN functions using FA signaling operating application 240-1 in the processor 213 as the automated mirroring and RSPAN/ERSPAN functions using FA signaling operating process 240-2. Those skilled in the art will understand that the network device 210 may include other processes and/or software and hardware components, such as an operating system not shown in this example.

During operation, processor 213 of network device 200 accesses memory system 212 via the interconnect 211 in order to launch, run, execute, interpret or otherwise perform the logic instructions of the automated mirroring and RSPAN/ERSPAN functions using FA signaling application 240-1. Execution of debugging automated mirroring and RSPAN/ERSPAN functions using FA signaling application 240-1 produces processing functionality in automated mirroring and RSPAN/ERSPAN functions using FA signaling process 240-2. In other words, the automated mirroring and RSPAN/ERSPAN functions using FA signaling process 240-2 represents one or more portions of the automated mirroring and RSPAN/ERSPAN functions using FA signaling application 240-1 (or the entire application) performing within or upon the processor 213 in the computer system 200.

It should be noted that, in addition to the automated mirroring and RSPAN/ERSPAN functions using FA signaling process 240-2, embodiments herein include the automated mirroring and RSPAN/ERSPAN functions using FA signaling application 240-1 itself (i.e., the un-executed or non-performing logic instructions and/or data). The automated mirroring and RSPAN/ERSPAN functions using FA signaling application 240-1 can be stored on a computer readable medium such as a floppy disk, hard disk, or optical medium. The automated mirroring and RSPAN/ERSPAN functions using FA signaling application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of automated mirroring and RSPAN/ERSPAN functions using FA signaling application 240-1 in processor 213 as the automated mirroring and RSPAN/ERSPAN functions using FA signaling process 240-2. Those skilled in the art will understand that the computer system 200 can include other processes and/or software and hardware components, such as an operating system that controls allocation and use of hardware resources associated with the computer system 200.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method, comprising:
launching a monitoring application on a network device communicatively connected to a server in a network, wherein the monitoring application comprises a Service Identifier (SID) value of a mirror stream;
issuing, from the monitoring application to the server, a Type Length Value (TLV) comprising the SID value corresponding to the mirror stream; and
receiving, at the monitoring application, the mirrored stream via a Remote Switch Port Analyzer (RSPAN) Virtual Local Area Network (VLAN).

2. The method of claim 1, wherein the server is a Fabric Attach (FA) server, and wherein the TLV is a FA TLV.

3. The method of claim 2, wherein the FA TLV comprises at least one of a Transmit (TX) bit and a Receive (RX) bit.

4. The method of claim 3, wherein the at least one of the TX bit and the RX bit use at least one reserved bit in the FA TLV.

5. The method of claim 3, wherein the at least one of the TX bit and the RX bit are part of a newly-defined TLV.

6. The method of claim 1, wherein the network comprises a Shortest Path Bridging (SPB) network.

7. The method of claim 1, wherein the RSPAN comprises an Encapsulated Remote Switch Port Analyzer (ERSPAN).

8. A non-transitory computer readable storage medium having computer readable code thereon, the medium including instructions in which a computer system performs operations comprising:
launching a monitoring application on a network device communicatively connected to a server in a network, wherein the monitoring application comprises Service Identifier (SID) values of monitored mirror streams;
issuing, from the monitoring application to the server, a Type Length Value (TLV) comprising the SID values corresponding to the monitored mirror streams;
assigning, by the monitoring application, a virtual local area network identifier (VLAN ID) in the TLV for at least two or more monitored mirror streams; and
multiplexing, at the monitoring application and based on the VLAN ID, the at least two or more monitored mirror streams, wherein the at least two or more monitored mirror streams are received via a Remote Switch Port Analyzer (RSPAN) Virtual Local Area Network (VLAN).

9. The non-transitory computer readable storage medium of claim 8, wherein the server is a Fabric Attach (FA) server, and wherein the TLV is a FA TLV.

10. The non-transitory computer readable storage medium of claim 9, wherein the FA TLV comprises at least one of a Transmit (TX) bit and a Receive (RX) bit.

11. The non-transitory computer readable storage medium of claim 10, wherein the at least one of the TX bit and the RX bit use at least one reserved bit in the FA TLV.

12. The non-transitory computer readable storage medium of claim 10, wherein the at least one of the TX bit and the RX bit are part of a newly-defined TLV.

13. The non-transitory computer readable storage medium of claim 10, wherein the TX bit and the RX bit are active at a same time.

14. The non-transitory computer readable storage medium of claim 8, wherein the RSPAN comprises an Encapsulated Remote Switch Port Analyzer (ERSPAN).

15. The non-transitory computer readable storage medium of claim 8, wherein the network comprises a Shortest Path Bridging (SPB) network.

16. A network device comprising:
a memory;
a processor; and
a communications interface,
wherein the memory, the processor, and the communications interface are communicatively coupled with each other,
wherein the memory is configured to store instructions that, when executed, cause the processor to:
launch, a monitoring application on the network device connected to a server in a network, wherein the monitoring application comprises Service Identifier (SID) values of monitored mirror streams;
issue, from the monitoring application to the server, a Type Length Value (TLV) comprising the SID values corresponding to the monitored mirror streams; and
multiplex, at the monitoring application and based on a virtual local area network identified (VLAN ID), the at least two or more monitored mirror streams, wherein the at least two or more monitored mirror streams are received via a Remote Switch Port Analyzer (RSPAN) Virtual Local Area Network (VLAN).

17. The network device of claim 16, wherein the server is a Fabric Attach (FA) server, and wherein the TLV is a FA TLV.

18. The network device of claim 17, wherein the FA TLV includes at least one of a Transmit (TX) bit and a Receive (RX) bit.

19. The network device of claim 18, wherein the at least one of the TX bit and the RX bit use at least one reserved bit in the FA TLV.

20. The network device of claim 16, wherein the RSPAN comprises an Encapsulated Remote Switch Port Analyzer (ERSPAN).

\* \* \* \* \*